United States Patent Office 2,976,312
Patented Mar. 21, 1961

2,976,312

PROCESS FOR MAKING THIONOPHOSPHORIC ACID ESTERS OF α-HYDROXY-METHYL-THIO-ETHERS

Gerhard Schrader, Wuppertal-Cronenberg, Germany, assignor to Farbenfabriken Bayer Aktiengesellschaft, Leverkusen, Germany, a corporation of Germany No Drawing. Filed Nov. 15, 1957, Ser. No. 696,628

Claims priority, application Germany Dec. 13, 1956

6 Claims. (Cl. 260—461)

The present invention relates to and has as its objects thiophosphoric acid esters of the following formula

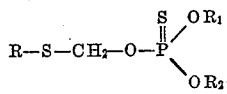

wherein R stands for the radical of a possibly substituted aliphatic, aromatic or aliphatic-aromatic hydrocarbon, $R_1$ and $R_2$ are alkyl radicals having preferably 1-4 carbon atoms.

Analogous phosphoric acid esters of the above shown type that means such ones in which the thionophosphorous sulfur is a thiol sulfur and the oxygen is bound by double bond to the phosphorus, are known in principle from the literature. Compounds of the above shown type, however, have not been prepared as yet.

Now in accordance with the present invention it has been found that the easily obtainable α-chloromethyl-thioethers which are known for example from Ann. 563, page 54–63 (1949), Ber. 69, page 1612 (1936) or German Patent No. 845,511, react surprisingly with any dialkylphosphites in the presence of sulfur in such a manner that the desired dialkyl thionophosphoric acid esters are directly formed with the evolution of hydrochloric acid. This may be seen from the following scheme:

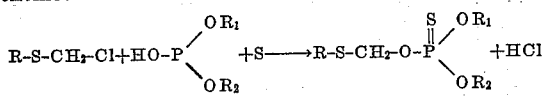

This reaction is generally carried out at temperatures of about 120–130° C. At these temperatures the evolution of hydrochloric acid and the additions of sulfur are completed within a relatively short time. It is also possible to effect the reaction in the presence of organic solvents. In this case it is however expedient to use only solvents in which hydrogen chloride is sparingly dissolved and which have a boiling point of 120–140° C. Chlorobenzene and xylene have proved to be particularly useful.

The new compounds of the present invention very effectively kill insects like flies, mites, aphids, etc. Most surprisingly they are of remarkable low toxicity against mammals. They may be used in the same manner as other known phosphoric insecticides, i.e. in a concentration from about 0.00001% to about 1.0%, diluted or extended with suitable solid or liquid carriers or diluents. Examples of such solid carriers are talc, chalk, bentonite, clay and the like, as liquid carriers there may be mentioned water (if necessary with commercial emulsifiers) alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers, etc.

As an example for the special utility of the inventive compounds the ester of the following formula

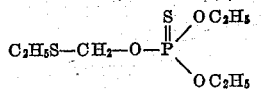

has been tested against two-spotted spider mites (*Tetranychus altaeae*, V. Hanst) on *Phaseolus vulgaris*. 100% killing is obtained with 0.01% solutions. These solutions have been prepared by mixing same amounts of active ingredient and dimethyl formamide, adding 20% referred to active ingredient of benzyl hydroxy diphenyl (commercial emulsifier), and diluting this premixture with water to the above shown concentration.

In the same test the ester of the following formula

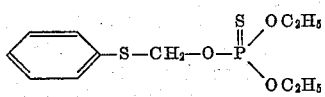

kills the two-spotted spider mites in a concentration of 0.01%.

The following examples illustrate the possibilities how to prepare the inventive compounds, without, however, restricting the present invention thereto.

Example 1

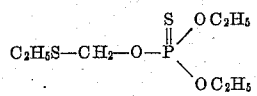

23 grams of α-chloro-methylthio-ethylether (B.P. 60° C./53 mm. Hg) are dissolved at room temperature in 28 grams of diethyl phosphite. 3.2 grams of sulfur are added to this solution. The reaction product is then briefly heated to 125° C. The temperature rises to 130° C. with the evolution of hydrochloric acid. The temperature is kept at 130° C. for a further 5 minutes when the evolution of hydrochloric acid is terminated. The reaction product is taken up in benzene, shaken with a 4% aqueous solution of sodium bicarbonate and then dried over sodium sulfate. After distillation of the solvent, the new ester is obtained as a yellow sparingly water-soluble oil. The ester boils under a pressure of 0.01 mm. Hg at 75–78° C.

Calculated: S=26.2%; P=12.7%. Found: S=25.97%; P=13.0%.

The new compound shows a $DL_{95}$ of 2.5 mg./kg. on rats orally.

Aphids are killed to 80 percent at concentrations of 0.001 percent, spider mites to 100 percent at concentrations of 0.01 percent. At this concentration the compounds show moreover a strong ovicidal action. Caterpillars are killed to 100 percent at concentrations of 0.1 percent.

Example 2

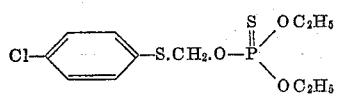

28 grams of diethylphosphite are dissolved in 50 millilitres of xylene. 6.4 grams of sulphur are added thereto with stirring. At 125° C., 40 grams of α-chloromethyl-p-chlorophenyl-thioether (B.P. 91° C./1 mm. Hg) are added dropwise. The temperature is kept at 125–130° C. for a further 5 minutes and the product is then worked up as described in Example 1. 30 grams of the new thionophosphoric acid ester, B.P. 120° C./0.1 mm. Hg, are thus obtained.

Calculated: Cl=10.9%; S=19.5%; P=9.5%. Found: Cl=11.2%; S=19.46%; P=10.2%.

The new ester shows a DL$_{95}$ of 5 mg./kg. on rats orally.

Spider mites are killed to 100 percent at a concentration of 0.001 percent. The compounds shows moreover a strong ovicidal action at this concentration. Caterpillars are killed to 100 percent at a concentration of 0.1 percent. Aphids are killed with certainty at concentrations of 0.01 percent.

*Example 3*

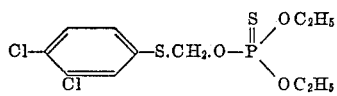

28 grams of diethyl phosphite are dissolved in 50 millilitres of xylene. 6.4 grams of sulphur are added thereto with stirring. 46 grams of α-chloromethyl-(3,4-dichlorophenyl)-thioether (B.P. 120° C./1 mm. Hg) are then added dropwise at 125° C. The temperature is maintained at 130-135° C. for 10 minutes and the product is then worked up in a method similar to that described above. 65 grams of the new ester are thus obtained as a pale yellow water-insoluble oil. The ester can be distilled only with decomposition under a pressure of 0.01 mm. Hg.

Calcuated: S=17.4%; P=8.5%. Found: S=16.7%; P=8.9%.

The new compound shows a DL$_{50}$ of 100 mg./kg. on rats.

Aphids are still killed to 90 percent at a concentration of 0.001 percent, spider mites to 100 percent at a concentration of 0.01 percent. The preparation shows a strong systemic action at a concentration of 0.1 percent. Caterpillars are killed to 100 percent at a concentration of 0.1 percent.

*Example 4*

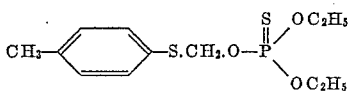

28 grams of diethylphosphite are dissolved in 50 millilitres of xylene. 6.4 grams of sulphur are added thereto and 35 grams of α-chloromethyl-p-methylphenyl-thioether (90° C./B.P. 1 mm. Hg) are added dropwise at 110-115° C. The temperature is then kept at 115° C. for a further 10-15 minutes and the product worked up in usual manner. 40 grams of the new ester are thus obtained as a water-soluble yellow oil. The ester boils at 130-132° C. under a pressure of 0.01 mm. Hg.

Calculated: S=20.9%; P=10.1%. Found: S=21.2%; P=9.8%.

This ester shows a DL$_{50}$ of 50 mg./kg. on rats.

Spider mites are completely killed at a concentration of 0.01 percent. The compound moreover shows at this concentration a strong ovicidal action. Aphids are still killed at a concentration of 0.01 percent.

By the same way there may be obtained the following esters using exactly the same molecular amount of the corresponding other chloro methyl thioethers and dialkyl phosphites:

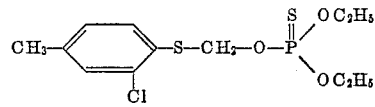

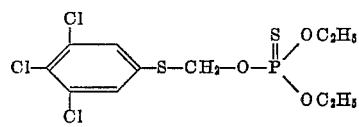

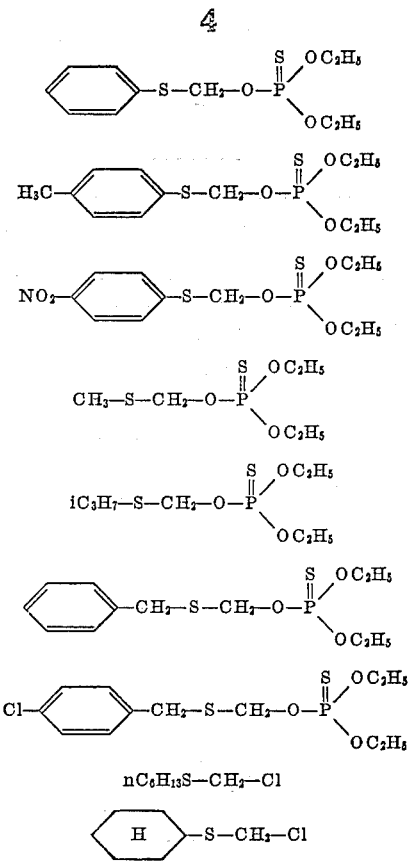

nC$_6$H$_{13}$S—CH$_2$—Cl

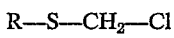

I claim:
1. A process for the formation of a thiophosphoric acid ester which comprises reacting a di-lower alkyl phopsphite with a compound of the following formula

R—S—CH$_2$—Cl in which R is selected from the group consisting of a lower alkyl radical, a phenyl radical, and a benzyl radical in the presence of sulfur.
2. The process of claim 1 wherein R is a lower alkyl radical.
3. The process of claim 1 wherein R is a phenyl radical.
4. The process of claim 1 wherein R is a benzyl radical.
5. The process of claim 1 which is carried out in the presence of an organic solvent in which hydrogen chloride is sparingly soluble.
6. The process of claim 5 wherein the organic solvent is a member selected from the group consisting of chlorobenzene and xylene.

References Cited in the file of this patent
UNITED STATES PATENTS

| | | |
|---|---|---|
| 2,494,283 | Cassaday et al. | Jan. 10, 1950 |
| 2,571,989 | Schrader | Oct. 16, 1951 |
| 2,597,534 | Schrader | May 20, 1952 |
| 2,759,010 | Lorenz et al. | Aug. 14, 1956 |
| 2,793,224 | Fancher | May 21, 1957 |